March 23, 1954 A. W. STUDEBAKER ET AL 2,672,682
PIPE-CUTTING MACHINE
Filed April 20, 1951 3 Sheets-Sheet 1

ARTHUR W. STUDEBAKER
JOHN H. BAILEY
INVENTORS

BY Lyon & Lyon
ATTORNEYS

ARTHUR W. STUDEBAKER
JOHN H. BAILEY
INVENTORS

BY Lyon Lyon
ATTORNEYS

Patented Mar. 23, 1954

2,672,682

UNITED STATES PATENT OFFICE 2,672,682

PIPE-CUTTING MACHINE

Arthur W. Studebaker and John H. Bailey, Brea, Calif.; said Bailey assignor to said Studebaker Application April 20, 1951, Serial No. 222,064

1 Claim. (Cl. 30—97)

This invention relates to pipe cutters and has particular reference to a power-operated machine for cutting pipe and the like.

One of the objects of this invention is to provide a portable and durable pipe cutting machine.

Another object of this invention is to provide a power-operated pipe cutting machine which is provided with automatic feed means for moving the cutters inwardly against the work being cut.

Another object of this invention is to provide a pipe cutting machine adapted to be quickly and easily positioned on the pipe to be cut.

Another object of this invention is to provide a pipe cutting machine adapted to be powered by a portable air or electric motor of conventional design, the machine having a right-angle drive permitting the drive shaft to extend radially of the pipe being cut for ready accessibility.

Another object of our invention is to provide a pipe cutting machine having an elongated housing or body adapted to be laterally applied to the pipe to be cut and adapted to be securely mounted thereon by means of widely spaced foot members, the elongated housing providing room for spaced bearings for a pinion driving shaft.

Other objects and advantages of this invention it is believed will be readily apparent from the following detailed description thereof when read in connection with the accompanying drawings.

In the drawings:

Figure 4 is a sectional elevation taken substantially on the line 4—4 of Figure 2.

Figure 5 is a sectional elevation, on an enlarged scale, taken substantially on the line 5—5 of Figure 2.

Figure 1:
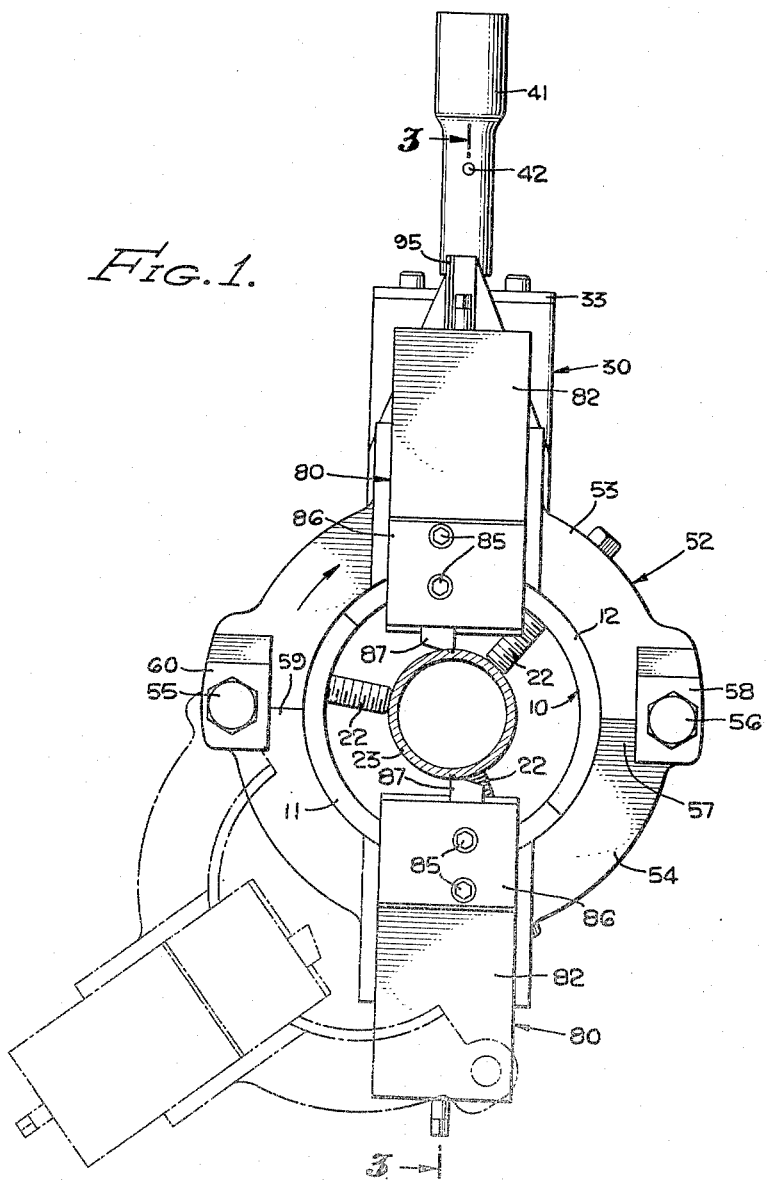
Figure 1 is a front elevation of a pipe cutting machine embodying our invention.
Figure 2:
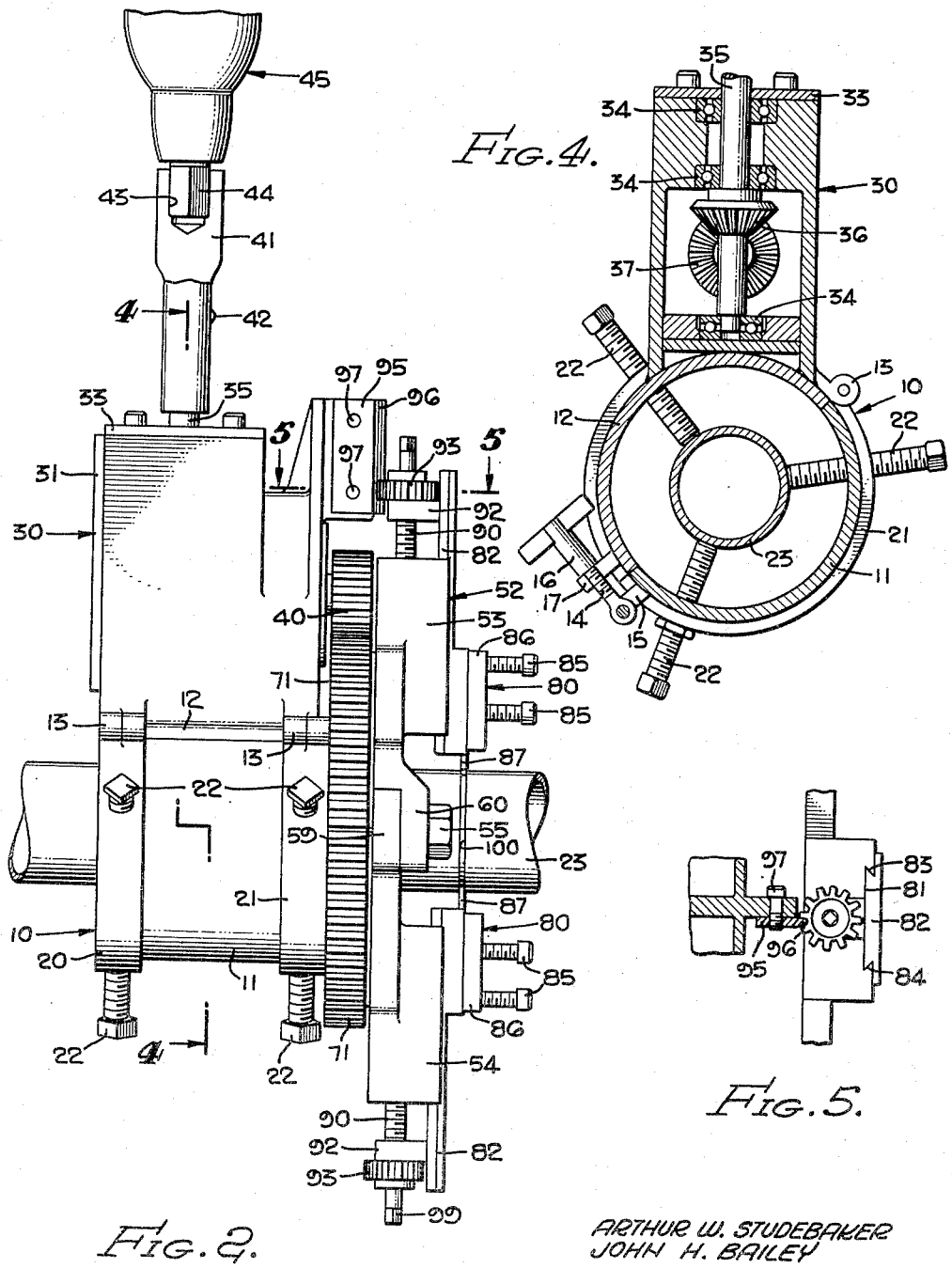
Figure 2 is a side elevation of the machine.

Referring now to the drawings, the preferred embodiment of my invention includes a body member generally indicated 10, preferably cylindrical in shape and longitudinally split into identical halves 11 and 12. The two halves 11 and 12 are pivotally connected together by means of the hinge member 13 and are locked together in the operative position shown by means of the locking dog 14 which is pivotally connected to a bracket 15 on the body half 11. The dog 14 is threaded as shown for the reception of wing nut 16 which is clamped against the bracket member 17 on the body half 12. The body member 10 is provided with a pair of annular shoulders 20 and 21, drilled and tapped at suitable intervals for jack screws 22 which support the machine on the pipe 23 to be cut. As shown, there are preferably three jack screws 22 in each of the two shoulders 20 and 21, the shoulders being spaced so as to permit relatively wide spacing of the screws 22, providing a solid mount for the body on the pipe.

Carried on the body member 10 is a gear box 30 provided with removable end plates 31 and 32 and top plate 33. The gear box may be made integral with one of the body halves, as shown, or may be removably bolted thereto if desired. Journaled in roller bearings 34 is a drive shaft 35 extending radially from the body member. Carried on the drive shaft is a bevel gear 36 engaged with a bevel gear 37 on one end of a jack shaft 38, which shaft is journaled in spaced bearings 39. A spur pinion 40 is carried on the other end of the jack shaft 38 which extends exteriorly of the gear box 30. A socket member 41 is secured to the upper end of the drive shaft 35 by means of cross-pin 42, and is provided with a non-circular socket 43 for the reception of the driving head 44 of a conventional air or electric motor 45. The motor 45 is not shown in detail since it is not of itself a part of this invention.

The body member 10 is provided at one end with a circumferential bearing surface 50 including a groove 51, and rotatably carried on this bearing surface is the cutter head generally indicated 52. This head is generally in the form of a split ring formed in two halves 53 and 54 which are pivotally connected together by means of a hinge pin 55. A lock bolt 56 extends through apertures (not shown) in overlapping portions 57 and 58 of the halves 53 and 54. Similar overlapping portions 59 and 60 are provided adjacent the hinge pin 55. Secured to the cutter head 52 by means of studs 70 is a split spur ring gear 71 adapted to be engaged with the spur pinion 40. The split spur ring gear 71 is provided with an annular shoulder 72 adapted to seat in the groove 51, thus preventing disassembly.

Mounting means are provided for the pair of cutter carriers 80, and as shown in the drawings these means may include a pair of dovetailed grooves 81, one spaced 90° from each of the splits between ring halves 53 and 54. The cutter carriers 80 each include a base plate 82 having inclined side walls 83 and 84 (see Figure 5) shaped to conform to the grooves 81 for sliding movement therein. Secured to each of the base plates 82 by means of screw members 85 is a cover clamp 86 adapted to retain a conventional cutting tool 87. The screws 85 may be loosened to permit the position of the tool to be changed or to permit replacement thereof.

Figure 3:
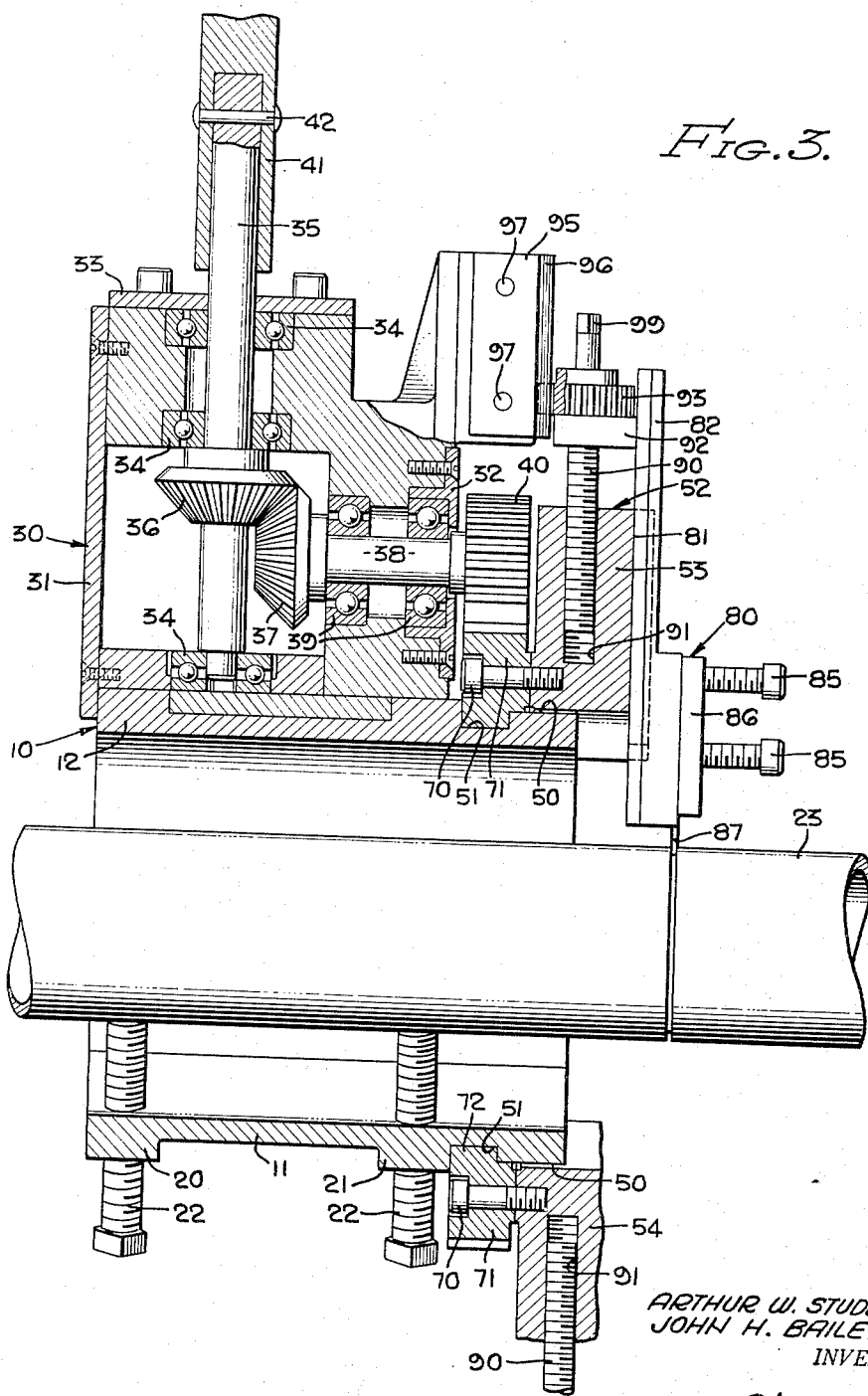
Figure 3 is a sectional elevation taken substantially on the line 3—3 of Figure 1.

Automatic feed means are provided for the cutting tools 87, and as shown in the drawings these means may include the feed screws 90 which are threadedly engaged in suitably tapped holes 91 in the cutter head 52. The feed screws 90 are journaled in bearing blocks 92, one carried on each of the cutter carrier base plates 82. Rigidly secured to each of the feed screws is a toothed wheel 93 adapted to bear against its associated bearing block 92. An extension plate 95 having a beveled portion 96 is secured to the gear box 30 by means of screw members 97 and is so disposed as to be contacted by the tooth wheels 93 as the cutter head 52 is rotated relative to the body member 10 and gear box 30 (see Figures 3 and 5). It will be thus understood that with each revolution of the cutter head the feed screws 90 are each advanced a fraction of a turn, causing the cutter carrier and tools 87 also to be moved radially inwardly a slight amount. The amount of radial movement per revolution may be varied, if desired, by changing the shape and number of teeth on the wheels 93.

The operation of the device is as follows: The body member 10 and cutter head 52 are disassembled one from the other by loosening the respective dog 14 and lock bolt 56 and pivotally separating the respective halves. With the halves thus opened up (see the phantom lines in Figure 1) the body member and cutter head may be applied laterally to the pipe to be cut and correctly positioned thereon. The halves 11 and 12 are clamped together by means of the wing nut 18 and the jack screws 22 are then tightened so that the body member is firmly mounted on the pipe and substantially concentric therewith. The cutter head may then be seated on the bearing surface 50, with the ring gear 71 in engagement with the spur pinion 40, and the lock bolt 56 fastened in place. The cutter tools 87 may then be adjusted to contact the pipe. As shown, the feed screws 90 are provided with square ends 99 for the reception of a suitable wrench to facilitate this operation. Upon the application of power from the motor 45 the pinion 40 will cause the ring gear 71, together with the cutter head 52, to turn in the direction of the arrow in Figure 1. As pointed out above, with each revolution of the cutter head the toothed wheels 93 will contact the extension plate 95, thus advancing the cutter tools 87. A continuous groove 100 will thus be cut in the pipe, the groove progressively increasing in depth with each revolution of the cutter head, until the pipe has been completely cut through.

It will be understood that the machine described above is particularly adapted for cutting pipe in trenches and the like, and that by means of the gearing arrangement described, wherein the drive shaft extends radially from the pipe, we have provided means permitting ready accessibility for use of the conventional portable air motor or the like. It will be further noted that the body member 10 is sufficiently long to provide adequate spacing of the two sets of jack screws 22, so that the device may be securely mounted on the pipe to be cut. The elongated body member further provides a base for the gear box with its spaced bearings for the support of the coacting shafts.

While we have shown and described a specific embodiment of our invention, we do not limit ourselves to the exact details of the construction set forth, and the invention embraces such changes, modifications and equivalents of the parts and their formation and arrangement as come within the purview of the appended claim.

We claim:

A pipe cutting machine, comprising: a longitudinally split tubular body member adapted to fit around a pipe; means for centering a pipe within said body; a journal at one end of said body member; a split annular cutting head rotatable on said journal; a pair of radial guide ways in the outer axial extremity of said cutting head; tool holder members slidable in said guide ways and each having a screwthreaded lug; a radial screw for each lug mounted in said cutting head; gear wheels carried by said screws; means on said body for engaging said gear wheels intermittently as said cutting head is rotated; a split spur gear carried by said cutting head; a housing means extending radially of said body; a jack shaft journaled in said housing in substantial parallelism with a pipe section held by said centering means; a spur pinion gear for said spur gear at one end of said jack shaft, a bevel gear at the other end of said shaft; a drive shaft, extending radially from said housing and having a second bevel gear for right angle drive connection with said jack shaft; and a thrust bearing for absorbing axial thrust on said jack shaft whereby axial thrust is not imparted to said annular cutting head.

ARTHUR W. STUDEBAKER.
JOHN H. BAILEY.

References Cited in the file of this patent

UNITED STATES PATENTS

| Number | Name | Date |
| --- | --- | --- |
| 587,093 | French | July 27, 1897 |
| 760,128 | Jackson | May 17, 1904 |
| 1,074,334 | Vosper | Sept. 30, 1913 |
| 1,749,861 | Vosper | Mar. 11, 1930 |
| 1,778,956 | Nelson | Oct. 21, 1930 |

FOREIGN PATENTS

| Number | Country | Date |
| --- | --- | --- |
| 480 | Great Britain | Mar. 3, 1855 |
| 440,292 | Great Britain | Dec. 24, 1935 |